US008233206B2

(12) United States Patent
Kramer et al.

(10) Patent No.: US 8,233,206 B2
(45) Date of Patent: Jul. 31, 2012

(54) USER INTERACTION WITH HOLOGRAPHIC IMAGES

(75) Inventors: Kwindla H. Kramer, Venice, CA (US); John S. Underkoffler, Los Angeles, CA (US); Michael A. Klug, Austin, TX (US); Mark E. Holzbach, Austin, TX (US)

(73) Assignee: Zebra Imaging, Inc., Austin, TX (US)

( * ) Notice: Subject to any disclaimer, the term of this patent is extended or adjusted under 35 U.S.C. 154(b) by 199 days.

(21) Appl. No.: 12/050,527

(22) Filed: Mar. 18, 2008

(65) Prior Publication Data

US 2009/0237763 A1   Sep. 24, 2009

(51) Int. Cl.
| G03H 1/26 | (2006.01) |
| G03H 1/22 | (2006.01) |
| G01C 3/00 | (2006.01) |
| G01C 5/00 | (2006.01) |
| G01C 3/08 | (2006.01) |
| G06F 3/048 | (2006.01) |
| G06K 9/00 | (2006.01) |

(52) U.S. Cl. ............. 359/23; 359/32; 356/3.1; 715/863; 382/154

(58) Field of Classification Search .................. None
See application file for complete search history.

(56) References Cited

U.S. PATENT DOCUMENTS

| 5,687,307 | A | 11/1997 | Akisada et al. ............... 345/428 |
| 6,195,104 | B1 | 2/2001 | Lyons |
| 6,330,088 | B1 | 12/2001 | Klug et al. |
| 6,750,848 | B1 | 6/2004 | Pryor |
| 6,795,241 | B1 | 9/2004 | Holzbach |
| 6,859,293 | B2 | 2/2005 | Klug et al. |
| 7,190,496 | B2 | 3/2007 | Klug et al. |
| 2004/0046736 | A1 | 3/2004 | Pryor et al. |
| 2006/0001650 | A1 | 1/2006 | Robbins et al. ............... 345/173 |
| 2006/0187196 | A1 | 8/2006 | Underkoffler et al. |
| 2007/0048702 | A1 * | 3/2007 | Jang et al. ..................... 434/224 |
| 2008/0144174 | A1 | 6/2008 | Lucente et al. |
| 2008/0170293 | A1 | 7/2008 | Lucente et al. |
| 2008/0231926 | A1 | 9/2008 | Klug et al. |

OTHER PUBLICATIONS

Grossman, Tovi, et al., "Multi-Finger Gestural Interaction with 3D Volumetric Displays," Proceedings of the 17th Annual ACM Symposium on User Interface Software and Technology, vol. 6, No. 2, Santa Fe, NM, pp. 61-70, Oct. 24-27, 2004.
"Hitachi shows off new stereoscopic vision display technology," *3rd Dimension*, Veritas et Visus, Temple, Texas, p. 15, Sep. 2007.

(Continued)

*Primary Examiner* — Jade R Chwasz
(74) *Attorney, Agent, or Firm* — Campbell Stephenson LLP

(57) ABSTRACT

User input is facilitated through gestural inputs with displayed two and three-dimensional objects using a holographic device and film that displays a static, digitally generated, three-dimensional, autostereoscopic, full-parallax, real image and a digital projector that displays dynamic images. A system includes computer-detectable tags mounted on a user-wearable glove, and on a base plate that holds the holographic device. The system determines the locations of the tags, and calculates a location of a feature of the image based on the locations of the tags. The system also determines the location, pose, and gestural motion of the input device based on the location of the tags. The system further calculates a distance and direction between the input device and the feature of the image.

23 Claims, 8 Drawing Sheets

OTHER PUBLICATIONS

Tovi Grossman et al., "The design and evaluation of selection techniques for 3D volumetric displays," *UIST 2006 Proceedings: ACM Symposium on User Interface Software and Technology*, pp. 3-12, 2006.

R. Narisetti, "IBM Plans a Magic Show for the Folks at Comdex," *The Wall Street Journal*, Nov. 17, 1997, 3 pages.

"Blue-C," project web page, http://blue-c.ethz.ch, 1 page, downloaded Apr. 14, 2009.

Bolt, Richard A., "'Put-That-There': Voice and Gesture at the Graphics Interface," *International Conference on Computer Graphics and Interactive Techniques*, pp. 262-270, Seattle, Jul. 14-18, 1980.

Businessweek Archives, "Let's Talk!," Speech technology is the next big thing in computing. Will it put a PC in every home? hap://www.businessweek.com/1998/08/b3566001.htm, 1998, 12 pages.

Gross, Markus, et al., preprint: "blue-c: A Spatially Immersive Display and 3D Video Portal for Telepresence," *ACM SIGGRAPH 2003: International Conference on Computer Graphics and Interactive Techniques*, ACM Press, pp. 819-827, 2003.

Grossman, Tovi, home page, http://www.dgp.toronto.edu/~tovi/, pp. 1-6, Apr. 14, 2009.

Grossman, Tovi et al., "Pointing at Trivariate Targets in 3D Environments," *CHI 2004 Conference Proceedings: ACM Conference on Human Factors in Computing Systems*, pp. 447-454, 2004.

Pfister, Hanspeter, web page for "3D Video at ETH Zurich," http://graphics.ethz.ch/research/past_projects/3dvideo/ (forwarded from http://graphics.ethz.ch/3dvideo), 1 page, 2004.

Gross, Markus, web page for "blue-c: A Spatially Immersive Display and 3D Video Portal for Telepresence," http://www.inf.ethz.ch/news/focus/res_focus/jun_2004, pp. 1-4, Aug. 22, 2005.

Harris, Michael; Moderator, NCR Human Interface Technology Center, "Interfaces for Humans: Natural Interaction, Tangible Data, and Beyond," Panels Conference Abstracts and Applications http://tangible.media.mit.edu/content/papers/pdf/panel_1_SG98.pdf, pp. 200-202.

Lucente, Mark, "IBM Plans a Magic Show for the Folks at Comdex," Mark Lucente—popular press: The Wall Street Journal, Monday, Nov. 17, 1997 article by Staff Reporter Raju Narisetti, http://www.lucente.us/press/1997wsj/index.html, 3 pages.

Lucente, Mark, et al., "Visualization Space: A Testbed for Deviceless Multimodal User Interface," IBM Research, Presented at Intelligent Environments Symposium, American Assoc. for Artificial Intelligence Spring Symposium Series, Mar. 23-25, 1998 at Stanford University, http://www.lucente.us/pubs/IE98.pdf, 6 pages.

Lucente, Mark—popular press: BusinessWeek Cover Story, 1998, Feb 23 "Let's Talk!" BusinessWeek cover story http://www.lucente.us/press/1998bw/BW1998.html, 3 pages.

Holzbach, Mark E. et al., "Multi-Core Porcessor Architercture for Active Autostereoscopic Emmisive Displays," U.S. Appl. No. 11/949,763, filed Dec. 3, 2007, consisting of Specification, Claims and Abstract (29 pages); and Drawings (5 sheets).

IBM Corporation, IBM Research: DreamSpace: natural interaction,: http://www.lucente.us/career/natural/dreamspace/index.html, 1995, pp. 1-8.

Wigdor, Daniel, et al., "Table-Centric Interactive spaces for Real-time Collaboration," *Proceedings of the working conference on Advanced visual interfaces*, Venezia, Italy, pp. 103-107, May 23-26, 2006.

Wigdor, Daniel, et al., "Effects of Display Position and Control Space Orientation on User Preference and Performance," *CHI 06: Proceedings of the SIGCHI Conference on Human Factors in Computing Systems*, Montréal, Québec, 10 pages, Apr. 22-27, 2006.

* cited by examiner

USER INTERACTION WITH HOLOGRAPHIC IMAGES

The U.S. Government has a paid-up license in this invention and the right in limited circumstances to require the patent owner to license others on reasonable terms as provided for by the terms of contract No. NBCHC050098 awarded by DARPA.

BACKGROUND

1. Field of the Invention

The present invention relates in general to the field of holographic images, and more particularly, to user interactions with autostereoscopic holographic displays through poses and gestures.

2. Description of the Related Art

A three-dimensional graphical display can be termed autostereoscopic when the work of stereo separation is done by the display so that the observer need not wear special eyewear. Holograms are one type of autostereoscopic three-dimensional display and allow multiple simultaneous observers to move and collaborate while viewing a three-dimensional image. Examples of techniques for hologram production can be found in U.S. Pat. No. 6,330,088 entitled "Method and Apparatus for Recording One-Step, Full-Color, Full-Parallax, Holographic Stereograms," naming Michael A. Klug, Mark E. Holzbach, and Alejandro J. Ferdman as inventors, which is hereby incorporated by reference herein in its entirety.

There is growing interest in auto stereoscopic displays integrated with technology such as haptic interfaces to facilitate accurate interaction between a user and three-dimensional imagery. An example of such integration can be found in U.S. Pat. No. 7,190,496 entitled "Enhanced Environment Visualization Using Holographic Stereograms," naming Michael A. Klug, Mark E. Holzbach, and Craig Newswanger as inventors, which is hereby incorporated by reference herein in its entirety.

SUMMARY

Described herein are systems and methods for providing user interaction with displayed two and three-dimensional objects through a gestural interface. The system includes a holographic device displaying a static, digitally generated, three-dimensional, autostereoscopic, full-parallax, real image. The holographic device includes a holographic film configured for normal illumination. In one implementation, the holographic film includes an interference pattern formed by interference of one or more object beams and one or more reference beams. The system also includes a projection system that illuminates the holographic film and displays two-dimensional shapes onto the holographic film. The system also includes a first set of one or more tags mounted on an input device, which is a glove, and a second set of one or more tags mounted on a support system of the holographic device and located with a fixed location relative to the image. The first set of tags can be, for example retroreflecting beads that are used to automate the detection of the input device. The second set of tags can similarly be retroreflecting beads used to automate the detection of a table or other support system for the holographic device and the three-dimensional image it generates. As an example, the input device is a glove worn by a user, and the first set of tags can be a set of retroreflecting markers that can be recognized by a motion-capture imaging system to identify the location, pose, and gesturing of the glove. The second set of tags can be, for example, retroreflecting markers affixed to the corners of a table on which a holographic film is placed, with the holographic film generating the three-dimensional image. The system also includes a locating system configured to determine locations of the tags in the first and second sets of tags, and a processor coupled to the locating system. The processor is configured to calculate a location of a feature of the image in response to the locations of the second set of tags, and a distance and direction between the input device and the feature of the image in response to the locations of the tags in the first and second sets of tags. The locating system is also able to identify an intersection of the input device with the feature of the image, based on the distance and direction between the input device and the feature of the image. The locating system can additionally be configured to identify the feature of the image in response to a user using the input device to poke the feature of the image.

One implementation of a method includes displaying an image using a holographic device including a holographic film, the image consisting of a static, digitally generated, three-dimensional, autostereoscopic, full-parallax, real image, and illuminating the holographic film to display two-dimensional shapes onto the holographic film. The method further includes detecting a first set of one or more tags mounted on at least one input device that is a glove wearable by a user, and detecting a second set of one or more tags mounted on a support system of the holographic device and having a fixed location relative to the static, digitally generated, three-dimensional, autostereoscopic, full-parallax, real image. The method also includes determining locations of the tags in the first and second set of tags and calculating a location of a first feature of the image in response to the locations of the tags in the second set of tags. The method continues by calculating a distance and direction between the input device and the first feature of the image in response to the locations of the tags, and by identifying an intersection of the input device with the first feature of the image in response to the distance and direction between the input device and the first feature of the image.

BRIEF DESCRIPTION OF THE DRAWINGS

The subject matter of the present application may be better understood, and the numerous objects, features, and advantages made apparent to those skilled in the art by referencing the accompanying drawings.

DETAILED DESCRIPTION

The following discussion sets forth a detailed description of the best contemplated mode for carrying out the invention.

The description is intended to be illustrative of the invention and should not be taken to be limiting.

Figure 1:
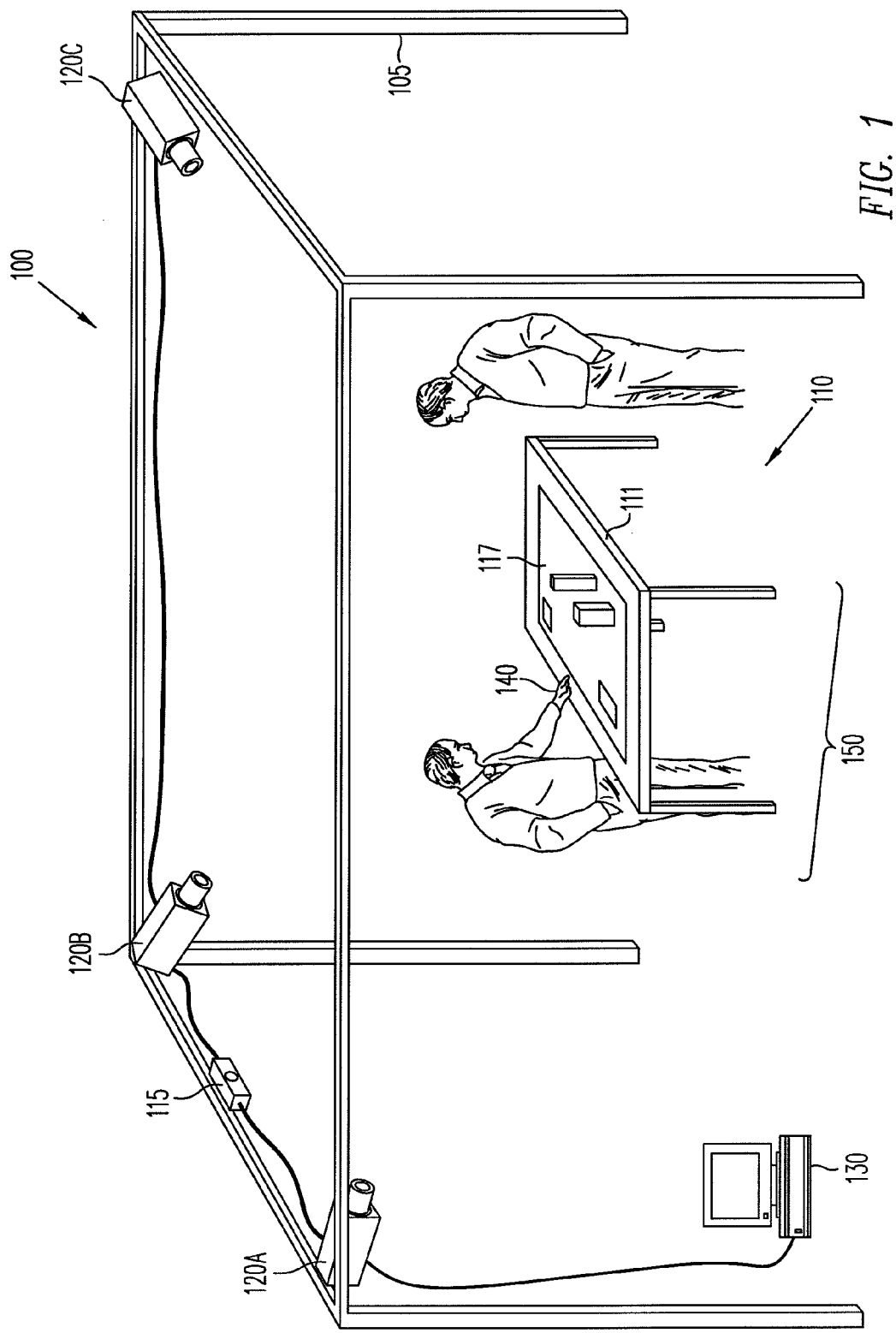
FIG. 1 shows an example of one implementation of an environment 100 in which a user can view and select objects on a display.

FIG. 1 shows an example of one implementation of an environment 100 in which a user can view and select objects on a display. The environment includes a display system 110 capable of displaying two- and three-dimensional holographic images, a set of detectors 120A, 120B, and 120C (collectively, the detectors 120) that observes the region around the images from display system 110, and a computer 130 coupled to detectors 120. Each of the detectors 120 includes an infrared emitter that generates a distinctly unique pulsed sequence of infrared illumination, and an infrared camera that receives infrared light. Detectors 120 are securely mounted on a rigid frame 105. Environment 100 also includes at least one user-controlled indicator, which a user can use as an input device to indicate selections of objects displayed by display system 110. The user-controlled indicator is a glove 140.

Objects displayed by display system 110 include two-dimensional and three-dimensional holographic objects. Display system 110 includes a computer-controlled projector 115 mounted on frame 105, and a rectangular flat tabletop 111 illuminated by projector 115. Projector 115 is aimed, focused, and controlled to display two-dimensional objects on tabletop 111. In this example, projector 115 is controlled by the same computer 130 that is coupled to detectors 120. It is also contemplated that two or more separate computers could be used to coordinate display and detection. Display system 110 includes a hologram film 117 that displays three-dimensional objects when viewed by a user at appropriate angles and under appropriate lighting conditions. In one implementation, hologram film 117 displays real images—that is, images that appear to a viewer to be located in a spatial location that is between the user and hologram film 117. Such real images are useful, for example, to provide users with access to the displayed objects in a region of space where users can interact with the displayed objects. In one application, real images are used to present "aerial" views of geographic terrain potentially including symbols, people, animals, buildings, vehicles, and/or any objects that users can collectively point at and "touch" by intersecting hand-held pointers or fingers with the real images. In this example, hologram film 117 is a reflection hologram recorded in a flexible sheet of polymer material. Hologram film 117 is placed on flat tabletop 111, so that projector 115 serves as the source of illumination, and so that the three-dimensional objects displayed by hologram film 117 appear to be co-located in an interaction region 150 along with the two-dimensional objects projected by projector 115.

Various applications may employ a combination of the computer-generated two-dimensional objects, produced by projector 115, and the static three-dimensional objects, made visible by hologram film 117. For example, the two-dimensional objects may be used to add cursors, text annotations, graphical annotations, topographic markings, roadmap features, graphical annotations, and other static or dynamic data to a static set of three-dimensional scenes or objects recorded in the hologram, such as a geographic terrain, cityscape, or architectural rendering. In one implementation, the two-dimensional objects include cursors, pointers, graphical symbols, text annotations, and movable images of people and vehicles and the three-dimensional objects include images of buildings, roads, vehicles and bridges based on data taken from actual urban environments. In another implementation, the three-dimensional images include hills and valleys based on data taken from actual rural environments in which various rainfall distributions are anticipated, and the two-dimensional objects include renderings of the resulting water flows based on hydrology simulations.

In the implementation shown in FIG. 1, detectors 120 gather data on the position in three-dimensional space of glove 140, as well as data on any poses made by the arrangement of the fingers of the glove. As the user moves, rotates, and flexes the glove around interaction region 150, detectors 120 and computer 130 use the collected data on the time-stamped locations and poses of the glove to detect various gestures made by the motion of the glove. Further information on gesture detection is available in U.S. Provisional Patent Application No. 60/651,290 by John Underkoffler, filed Feb. 8, 2005 and titled "Gesture based control system," and in U.S. patent application Ser. No. 11/350,697 by John S. Underkoffler and Kevin T. Parent, filed Feb. 8, 2006 and titled "System and method for gesture based control system" (collectively referred to herein as the "Underkoffler references").

Figure 2:
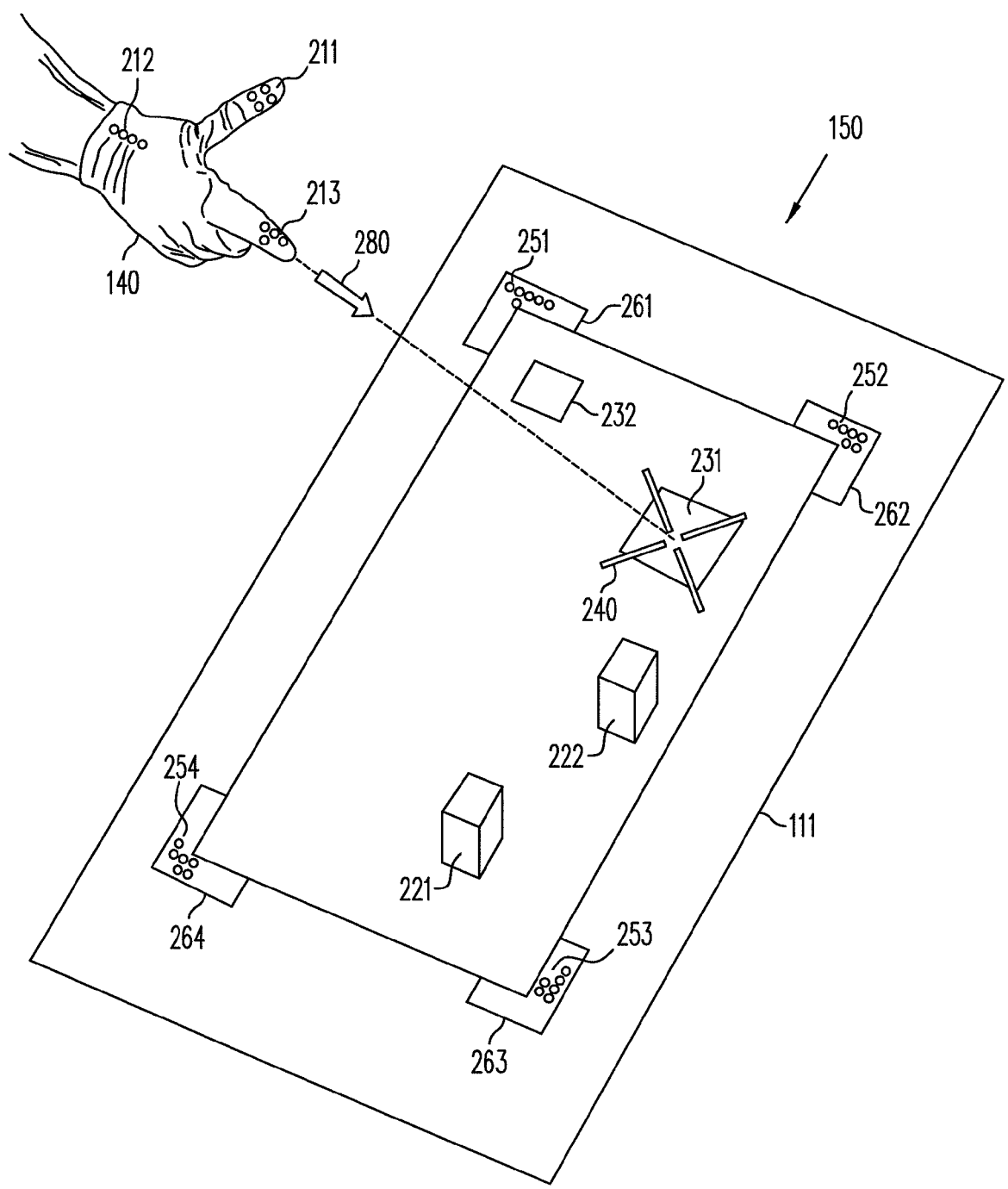
FIG. 2 shows an example of an interaction between an input device glove and an object projected by a display system.

FIG. 2 shows an example of an interaction between glove 140 and an object 231 projected by display system 110 in environment 100 (from FIG. 1), and as further described in the Underkoffler references. A user wearing the glove makes a "gun" pose, with the index finger and thumb extended at an approximately 90° angle and the other fingers curled towards the palm of the hand. In one implementation of environment 100, the gun pose is used to point at locations and objects displayed on tabletop 111. The user can drop the thumb of the gun pose into a closed position approximately parallel to the index finger. This motion is understood by detectors 120 and computer 130 as a gesture that selects an object at which the gun pose is pointing.

Several objects are displayed on tabletop 111 in FIG. 2. These object include two 2-dimensional rectangular objects 231 and 232, which are projected through the computer-controlled projector 115. These objects also include two 3-dimensional static objects 221 and 222 (two rectangular blocks), which are visible to a user who views hologram film 117 from appropriate angles.

In this example, the user uses the gun pose to point at object 231 on tabletop 111. Object 231 is a computer-generated two-dimensional rectangle projected by the computer-controlled projector 115 from FIG. 1. To assist the user in pointing at a desired object, computer-controlled projector 115 also displays a two-dimensional cursor 240 that moves along with a location where the gun pose points on tabletop 111, as further described in the Underkoffler references. The user can then orient the gun pose of glove 140 so that the cursor 240 intersects the desired object, such as two-dimensional object 231. This geometrical relationship—the user pointing at a displayed object as shown in FIG. 2—is detected by the computer 130 from FIG. 1 using detectors 120.

Environment 100 carries out a variety of operations so that computer 130 is able to detect such interactions between a user and the displayed objects. For example, detecting that a user is employing glove 140 to point at object 221 involves (a) gathering information on the location and spatial extents of object 221 and other objects being displayed, (b) gathering information on the location and pose of glove 140, (c) performing a calculation to identify a vector along which glove 140 is pointing, and (d) determining that the location of object 221 coincides with those coordinates. The following discussion addresses each of these operations. Additional information is also available in the Underkoffler references.

Various techniques may be used to gather information on the location and spatial extents of the objects displayed by display system 110. One approach requires a stable mounting of computer-controlled projector 115 on frame 105 and a stable location of tabletop 111, fixed with respect to frame 105. The location of tabletop 111 and the location and orientation of projector 115 can then be measured relative to detectors 120, which are also stably mounted on frame 105. This relative location information can be entered into computer 130. Since tabletop 111 defines the display region for the two- and three-dimensional images, computer 130 is thus made aware of the location of the display surface for the images. The location of two-dimensional objects on the display surface is known to computer 130 (from FIG. 1), since this computer is the device that controls the projection of the two-dimensional objects through projector 115. As needed over time, projector 115 can be manually or automatically adjusted to maintain a proper alignment, and/or the projector information can be recalibrated to compensate for drifts in the projector alignment. Similarly, hologram film 117 can be rigidly mounted onto tabletop 111, so that the three-dimensional objects displayed by the hologram film are fixed with well-defined locations relative to tabletop 111, frame 105, and detectors 120.

Data concerning the three-dimensional objects encoded in the hologram film 117 can be entered into computer 130. These data describe the apparent locations of the three-dimensional objects with respect to hologram film 117. These data are combined with data regarding the mounting position of hologram film 117 with respect to tabletop 111. As a result, computer 130 can calculate the apparent locations of the three-dimensional objects with respect to tabletop 111, and thus, with respect to the interaction region 150 in which the two- and three-dimensional images appear to a user. This information allows computer 130 to carry out a registration with 1:1 scaling and coincident spatial overlap of the three-dimensional objects with the interaction region 150. To facilitate accurate and reproducible mounting of hologram film 117, the tabletop may be equipped with mounting brackets 261, 262, 263, and 264, which fix the position of two diagonal corners of a hologram film on tabletop 111.

A second approach is also contemplated for gathering information on the location and spatial extents of the displayed two- and three-dimensional objects. This approach is similar to the approach described above, but can be used to relax the requirement of a fixed location for tabletop 111. In this approach, tabletop 111 does not need to have a fixed known location relative to frame 105 and detectors 120. Instead, detectors 120 are used to determine the location and orientation of tabletop 111 during regular operation. In various implementations, detectors 120 are capable of repeatedly ascertaining the location and orientation of tabletop 111, so that even if tabletop 111 is shifted, spun, or tilted, the relevant position information can be gathered and updated as needed. In this approach it is nonetheless helpful to have projector 115 rigidly mounted on frame 105, so that the projected two-dimensional images remain well-defined with respect to the environment 100. Similarly, it is helpful to have hologram film 117 stably mounted on tabletop 111, so that the locations of the three-dimensional objects displayed by the hologram move in a well-defined predictable manner when tabletop 111 moves. Thus, by tracking any movement of tabletop 111, detectors 120 can track the resulting movement of the three-dimensional objects from hologram film 117.

One technique by which detectors 120 and computer 130 can determine the location of tabletop 111 is to use recognizable visible tags attached to the surface of tabletop 111. The tags can be implemented, for example, using small retroreflecting beads, with the beads arranged in unique patterns for each tag. In the example of FIG. 2, tabletop 111 has four distinct visible tags 251, 252, 253, and 254. These tags are shown as combinations of dots arranged in four different geometric patterns, placed at the four corners of tabletop 111. In this example, the tags are mounted on the four brackets 261, 262, 263, and 264, which are fixed onto tabletop 111. Tabletop 111 is constructed of rigid material, so that the four tags have a fixed spatial relationship (distance and direction) with respect to each other and to the tabletop. Measurements regarding the location of these four tags relative to each other and to the spatial extents of the tabletop are pre-entered into computer 130. When detectors 120 detect the locations in three-space of the four tags, these locations can be provided to computer 130. Using the pre-entered tabletop measurements, computer 130 can then deduce the location, azimuthal orientation, and inclination of tabletop 111. In one implementation, the computer uses the spatial location of at least three of the tags to identify a plane of the tabletop. In another implementation, the computer uses the spatial orientation of at least one of the tags to identify the plane of the tabletop.

Detectors 120 use pulsed infrared imaging and triangulation to ascertain the locations of each of the tags 251, 252, 253, and 254. Additional information is also available in the Underkoffler references. Each of the detectors 120A, 120B, and 120C illuminates the region around tabletop 111 periodically with a pulse of infrared light. The reflected light is collected by the emitting detector and imaged on a charge coupled device (or other suitable type of sensor). Circuitry in each detector identifies the four tags based on their unique patterns; the data from the three cameras is then combined to calculate the position in three-space of each of the four tags. Additional detectors may also be used. For example, if four or five detectors are used, the additional detector(s) provides some flexibility in situations where one of the other detectors has an obscured view, and may also provide additional data that can improve the accuracy of the triangulation calculations. In one implementation, environment 100 uses eight detectors to gather data from the interaction region 150.

Detectors 120 may include motion capture detectors that use infrared pulses to detect locations of retroreflecting tags. Such devices are available, for example, from Vicon Limited in Los Angeles, Calif. The infrared pulses may be flashes with repetition rates of approximately 90 Hz, with a coordinated time-base operation to isolate the data acquisition among the various detectors. Tags 251, 252, 253, and 254 may be implemented using passive retroreflecting beads with dimensions of approximately 1 mm. With spherical beads and appropriate imaging equipment, a spatial resolution of approximately 0.5 mm may be obtained for the location of the tags. Further information on the operation of an infrared location system is available in the Underkoffler references.

Detectors 120 can be configured to make fast regular updates of the locations of tags 251, 252, 253, and 254. Thus, computer 130 can be updated if the location of the tags, and therefore of tabletop 111 moves over time. This configuration can be used to enable a rotating tabletop. In one implementation, the hologram film 117 used in display system 110 is configured to be viewed under normal illumination, from a direction perpendicular to the film. (For example, hologram film 117 can be constructed using optics in which a reference beam normally illuminates the hologram film.). In this implementation, display system 110 includes a light source (not shown) that is mounted directly above tabletop 111 to provide normal illumination. In this implementation, tabletop 111 can be readily mounted on a rotating support, so that tabletop 111, and the hologram film mounted thereon, can be rotated for the convenience of users. As hologram film 117 is rotated, the overhead light source continues to serve as a properly angled source of illumination.

Detectors 120 and computer 130 can also be used to gather information on the location and pose of glove 140, as described in the Underkoffler references. Additional tags 211, 212, and 213 are depicted in FIG. 2 as being attached on the thumb, index finger, and wrist, respectively, of glove 140 in this example. Additional tags may also be used on glove 140. By obtaining the three-space location of the tags, detectors 120 obtain position information for the points on the glove to which they are attached.

With appropriate placement of the tags, and with consideration to the anatomy of a hand, detectors 120 and computer 130 can use the three-space positions of tags 211, 212, and 213 to determine the location, pose, and gesturing of the glove, as described in the Underkoffler references. In the example of FIG. 2, the three-space positions of the glove-mounted tags 211, 212, and 213 indicate where glove 140 is located and also that glove 140 is being held in a gun pose. That is, the positions of the glove-mounted tags, relative to each other, indicate that the index finger is extended and the thumb is being held away from the index finger in this example. The pose of glove 140 can similarly be deduced from the information about the positions of tags 211, 212, and 213. The pose may be characterized, for example, by angles that describe the inclination of the pointing index finger (e.g., the direction of a vector between tags 212 and 213), and the inclination of the extended thumb (using tags 211 and 212 and appropriate anatomical information).

Having deduced that the glove 140 is being held in a gun pose, computer 130 can proceed to identify coordinates at which glove 140 is pointing. That is, computer 130 can use the position information of tags 211, 212, and 213 and appropriate anatomical information to calculate a vector 280 along which a user is pointing, as described in the Underkoffler references.

Computer 130 then performs a calculation to determine which object(s), if any, have coordinates along the vector 280. This calculation uses the information about the positions of the two- and three-dimensional objects, and also employs data regarding the extents of these objects. If the vector 280 intersects the extents of an object, computer 130 (from FIG. 1) ascertains that the user is pointing at that object. In the example of FIG. 2, the computer ascertains that the user is pointing at two-dimensional object 231. Visual feedback can be provided to the user, for example by causing object 231 to visibly undulate (not shown) when the user points at object 231. In addition or instead, auditory feedback, for example using a beep sound generated by a speaker coupled to computer 130, can also be provided to show that the user is pointing at an object.

Figure 3:
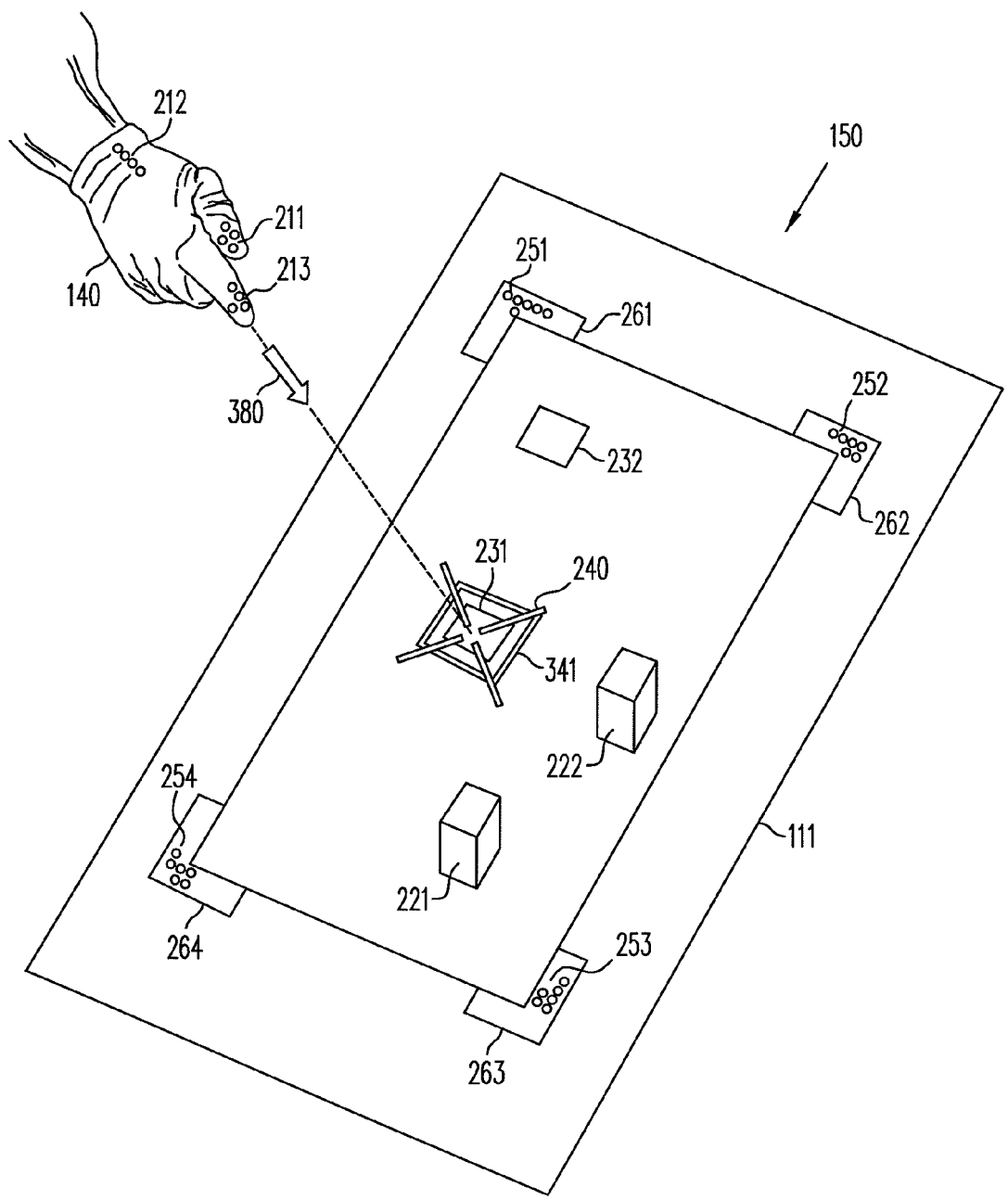
FIG. 3 illustrates an operation in which a user manipulates a displayed rectangle with the glove.

FIG. 3 illustrates an operation in which a user manipulates a displayed object 231 with glove 140. In comparison with FIG. 2, object 231 has been repositioned. This operation involves the user selecting the object by changing the pose of glove 140, and moving the object by a motion of the glove. In the illustrated example, a user changes the pose of the glove from an open gun to a closed gun by bringing the thumb close to the index finger while pointing at object 231. This motion is interpreted as a gesture that selects object 231. Detectors 120 detect the resulting locations of tags 211, 212, and 213 on the glove, and pass these locations on to computer 130. Computer 130 determines that the locations of the tags have changed relative to each other and recognizes the change as indicating a selection gesture. Since the user is pointing at cross-shaped object 231 while the selection gesture is performed, computer 130 deems this object 231 to be selected by the user. Visual feedback can be provided to the user, for example by displaying a two-dimensional highlight border 341 around object 231 to indicate that the user has selected object 231. In addition or instead, auditory feedback, for example using a beep sound, can also be provided to show that the user has selected an object. (Other indications of visual and auditory feedback for selected objects are also contemplated, such as a change in size, a geometric pulsing, an encircling, a change in color, or a flashing of the selected object, or an auditory chime, bell, or other alert sound, or others, or some combination thereof. Similarly, various forms of visual feedback can also be provided when a user points at a displayed object.)

In addition, computer 130 can also change the image projected through projector 115 in response to a change in location or pose of glove 140. In the illustrated example, the user has changed the direction at which the glove points; the direction of pointing 380 is different in FIG. 3 than it was (280) in FIG. 2. This motion is used in the illustrated example to move a selected object across the surface of tabletop 111. As illustrated, object 231 has been repositioned accordingly. The user may de-select object 231 in the new location by raising the thumb (not shown), thereby returning glove 140 to the open gun pose. Computer 130 would respond accordingly by removing the highlight border 341 from object 231 in the new position.

The user-directed repositioning of two-dimensional objects may be usable, for example, to control the placement of two-dimensional shapes, text, or other overlay features displayed in conjunction with a three-dimensional holographic image. Other user-directed operations on the displayed objects are also contemplated, such as arranging various two-dimensional objects in home positions arrayed in a grid or in a circular pattern. Various operations can be done with right-hand gestures, left-hand gestures, or simultaneously with both hands. More than two hands simultaneously are even possible, i.e. with multiple users. For example, various operations may be performed based on collaborative gestures that involve a one-handed gesture from a user along with another one-handed gesture from another user. Similarly, it is contemplated that multi-user gestures may be involve more than two users and/or one or two-handed gestures by the users, as described in the Underkoffler references.

Figure 4:
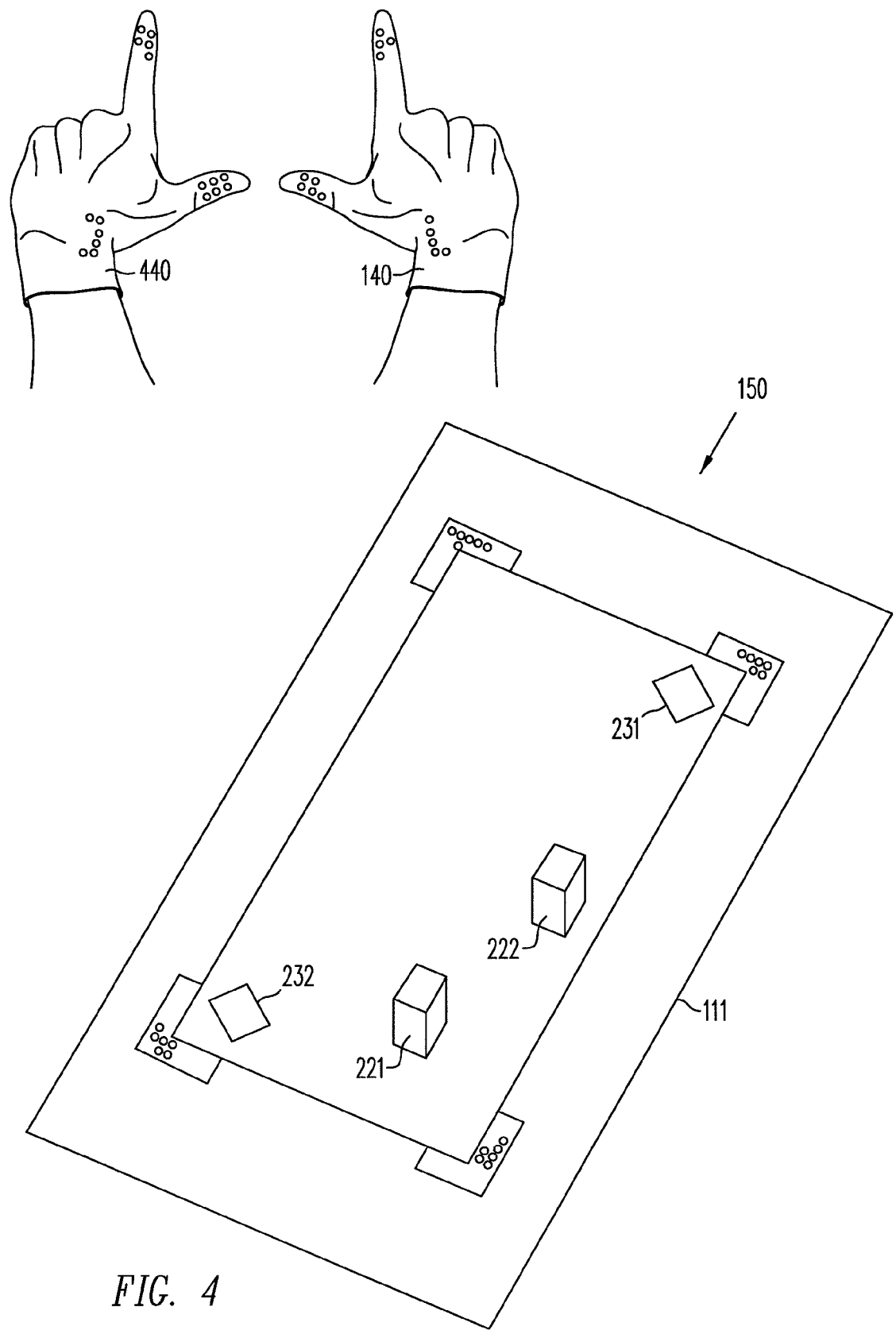
FIG. 4 illustrates a two-handed operation by which two-dimensional objects are moved to into corner positions.

FIG. 4 illustrates a two-handed operation by which two-dimensional objects are moved to into corner positions. In this example, a user employs two gloves, 140 and 440, each with appropriately mounted tags that can be recognized and individually identified by detectors 120. When a user makes a "goalpost" pose (using two side-by-side gun poses) and rotates the index fingers upwards, computer 130 recognizes this gesture as a return-to-corner command, as described in the Underkoffler references. In response, computer 130 causes the objects 231 and 232 to move to adjacent corners of tabletop 111.

Figure 5A:
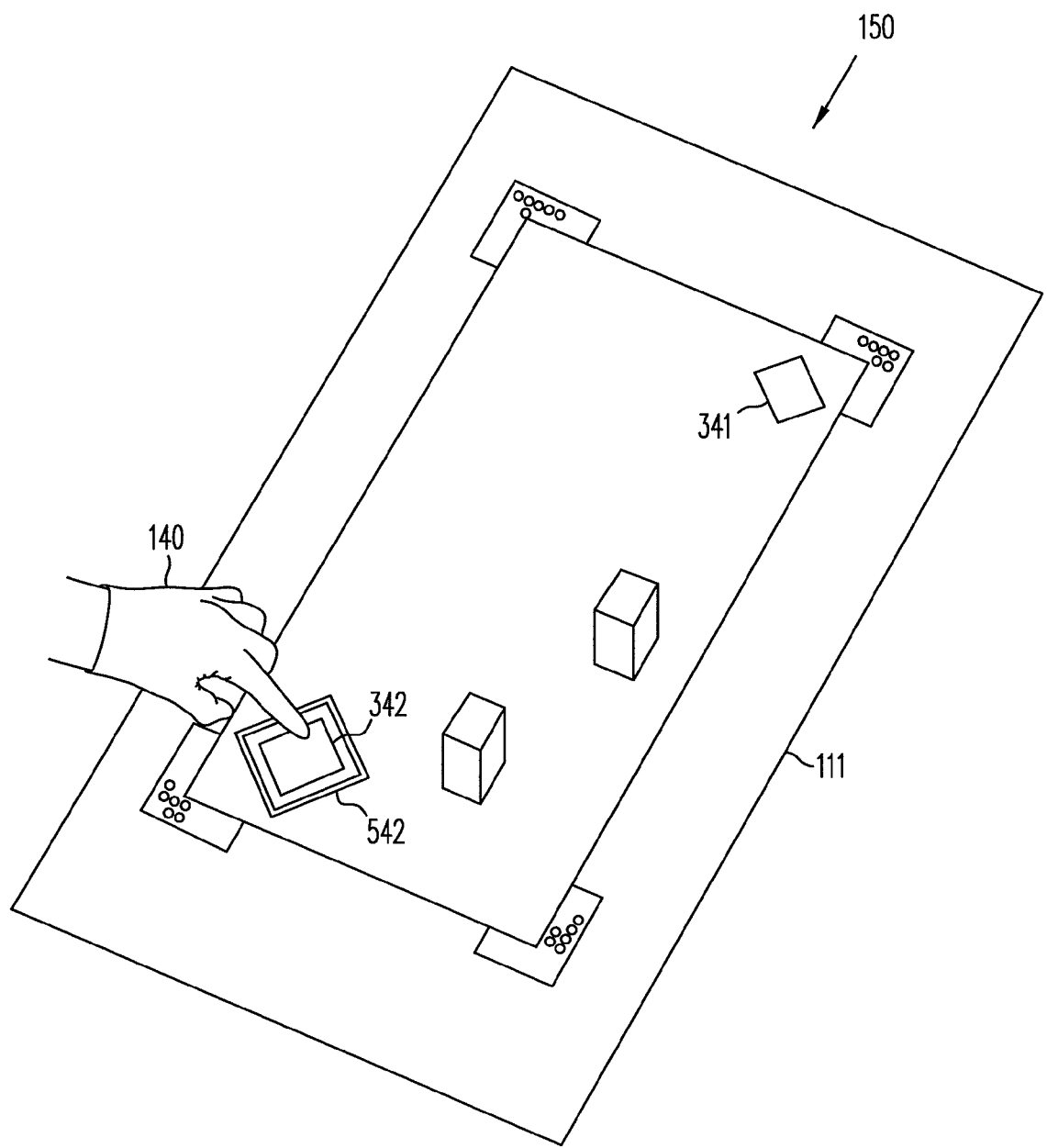
FIGS. 5A and 5B illustrate a poke operation through which a user can manipulate displayed two-dimensional objects.
Figure 5B:
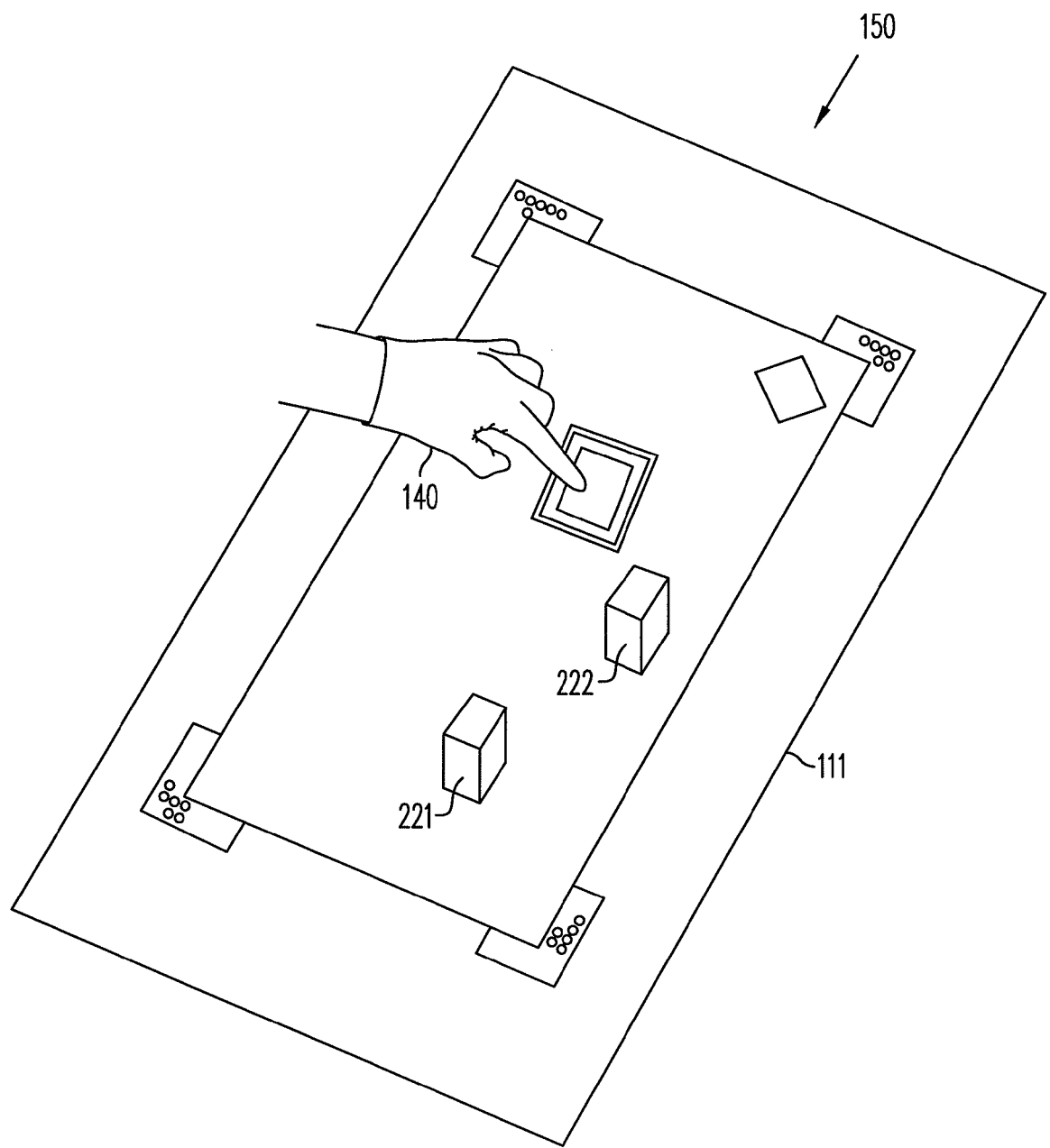
Figure 6:
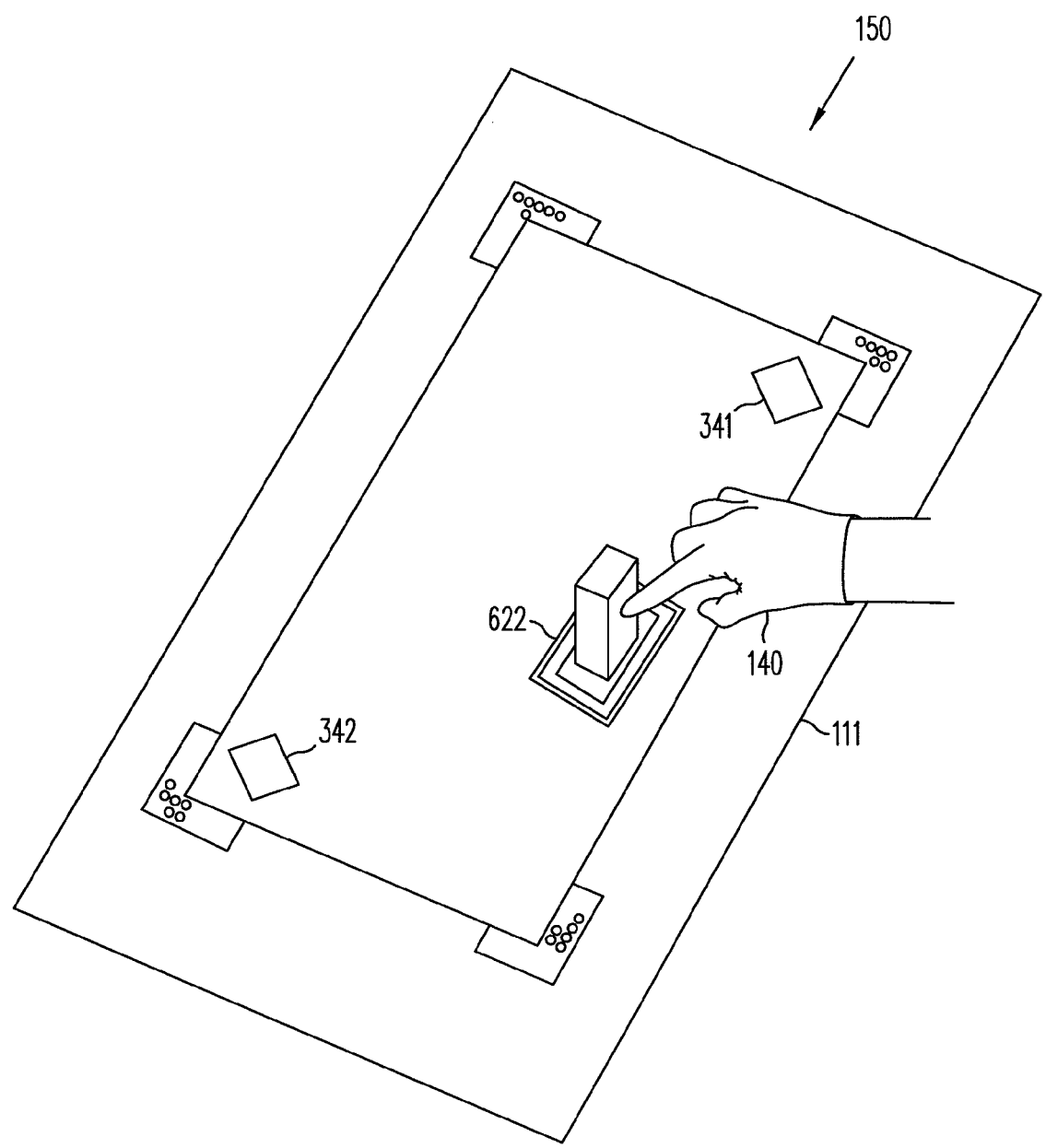
FIG. 6 illustrates a poke operation through which a user can select a displayed three-dimensional object.

FIGS. 5A, 5B, and 6 illustrate other types of operations through which a user can manipulate displayed objects. In this example, a user touches tabletop 111 with the extended index finger of glove 140. As shown in FIG. 5A, the user touches the location where object 342 is displayed. This position and pose of the glove is interpreted as a selection of object 232 by "poking" the object 232. Visual feedback and auditory is provided to the user by displaying a two-dimensional highlight border 542 around object 232 and sounding a chime to indicate that the user has selected rectangle 542. The user then drags the index finger of glove 140 to a new location on the surface of tabletop 111. Computer 130 responds by causing object 232 to be projected as moving along with the user's index finger, thereby displaying the dragging of the object a new position, shown in FIG. 5B.

FIG. 6 shows another operation, in which a user selects a three-dimensional object by poking the three-dimensional object. In this example, the user touches three-dimensional object 222 with the index finger of glove 140. The locations of the tags on glove 140 are detected by detectors 120, which pass the location information on to computer 130. Computer 130 uses this location information, in combination with location information of the tags mounted on tabletop 111, to ascertain that the user's fingertip has intersected the extents of three-dimensional object 222. Visual and auditory feedback is provided to the user, in this example by displaying a two-dimensional highlight border 622 around object 222 and by sounding an audible beep.

Figure 7:
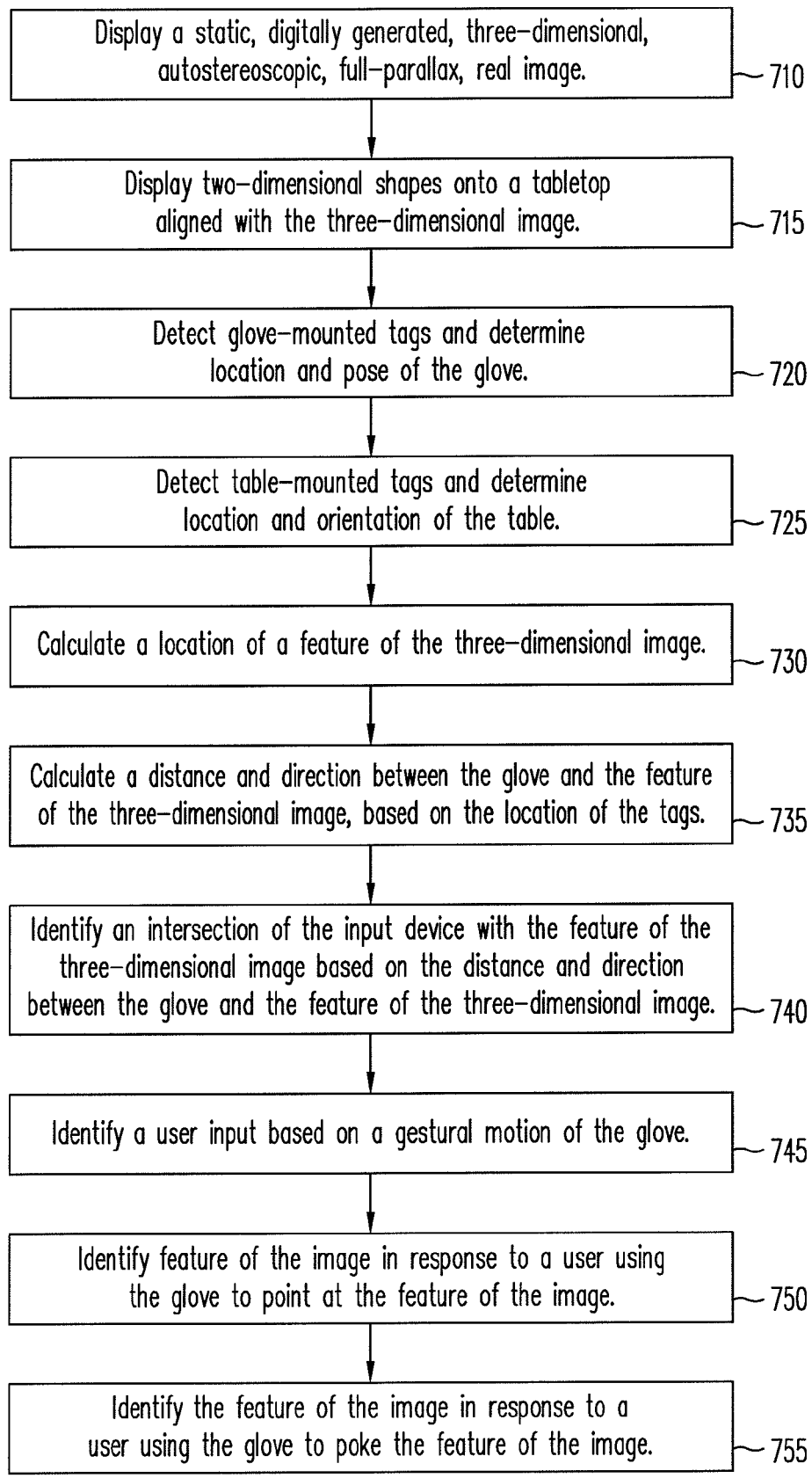
FIG. 7 is a flowchart showing a procedure for recognizing user input in an environment that displays three-dimensional images.

FIG. 7 is a flowchart showing a procedure for recognizing user input in an environment that displays three-dimensional images. The procedure commences in act 710 by displaying a static, digitally generated, three-dimensional, autostereoscopic, full-parallax, real image. For example, the image may be produced by a holographic film that is securely mounted onto a tabletop in an interaction region that is accessible to users. In act 715, two-dimensional shapes are displayed in alignment with the three-dimensional image. The procedure continues in act 720 by detecting tags mounted on a glove worn by a user, and by determining the location and pose of the glove based on the tags. In act 725, the procedure detects tags mounted with a fixed relationship to the three-dimensional image. For example, these, tags can be fixed to particular locations of the tabletop. Based on these tags, a determination is made of the location and orientation of the tabletop.

In act 730, the procedure calculates a location of a feature of the three-dimensional image. This calculation is based on the location and orientation of the tabletop, and on data describing the features shown in the three-dimensional image. In act 735, the procedure then calculates a distance and direction between the glove and the feature of the three-dimensional image, based on the location of the tags.

In act 740, the procedure may identify an intersection of the input device with the feature of the three-dimensional image based on the distance and direction between the glove and the feature of the three-dimensional image. Other operations are also contemplated. For example, in act 745 the procedure identifies a user input based on a gestural motion of the glove. In act 750, the procedure identifies a feature of the image in response to a user using the glove to point at the feature of the image, and in act 755 the procedure identifies the feature of the image in response to a user using the glove to poke the feature of the image.

FIGS. 1-7 illustrate some of the many operational examples of the techniques disclosed in the present application. Those having ordinary skill in the art will readily recognize that certain steps or operations described herein may be eliminated or taken in an alternate order. Moreover, the operations discussed with respect to FIGS. 1-6 may be implemented as one or more software programs for a computer system and encoded in a computer readable medium as instructions executable on one or more processors. The computer readable medium may include a solid-state storage medium, a magnetic storage medium, or an optical storage medium, or combinations thereof. The software programs may also be carried in a communications medium conveying signals encoding the instructions. Separate instances of these programs may be executed on separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above may be utilized with a variety of different storage devices and computing systems with variations in, for example, the number and type of detectors and user input devices. Those having ordinary skill in the art will readily recognize that the data processing and calculations discussed above may be implemented in software using a variety of computer languages, including, for example, traditional computer languages such as assembly language, Pascal, and C; object oriented languages such as C++, C#, and Java; and scripting languages such as Perl and Tcl/Tk. Additionally, the software may be provided to the computer system via a variety of computer readable media including electronic media (e.g., flash memory), magnetic storage media (e.g., hard disk, a floppy disk, etc.), or optical storage media (e.g., CD-ROM). Communications media conveying signals encoding the instructions may also be used to provide the software (e.g., via a network coupled to a network interface).

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A system comprising:
   a holographic device including a holographic film and displaying a static, digitally generated, three-dimensional, autostereoscopic, full-parallax, real image;
   a projection system configured to illuminate the holographic film and to display two-dimensional shapes onto the holographic film;
   a first set of one or more tags mounted on at least one input device that is a glove wearable by a user;
   a second set of one or more tags mounted on a support system of the holographic device and located with a fixed distance and direction to the image;
   a locating system configured to determine locations of the first and second set of tags; and
   a processor coupled to the locating system and configured to calculate:
   a location of a first feature of the image in response to the location of the second set of tags, and
   a distance and direction between the input device and the first feature of the image in response to the location of the first and second sets of tags;
   wherein the locating system is further configured to identify an intersection of the input device with the first feature of the image in response to the distance and direction between the input device and the first feature of the image.

2. The system of claim 1, wherein the first set of tags comprises four first tags located at different locations adjacent to the holographic device.

3. The system of claim 1, wherein the locating system is further configured to recognize a gestural motion of the input device as a user input.

4. The system of claim 1, wherein the locating system is further configured to identify one or more of: a first user input in response to the input device being shaped into a gun pose, a second user input in response to the input device being shaped into a gesture comprising a gun pose and a thumbdown motion, a third user input in response to the input device being shaped into a flat-hand pose, or a fourth user input in response to the input device being shaped into an "ok" pose.

5. The system of claim 1, wherein the locating system is further configured to identify the first feature of the image in response to a user using the input device to point at the first feature of the image.

6. The system of claim 1, wherein the locating system is further configured to identify the first feature of the image in response to a user using the input device to poke the first feature of the image.

7. The system of claim 6, wherein the locating system is further configured to identify a second feature of the image in response to a user using the input device to poke the second feature of the image.

8. The system of claim 1, wherein the input device comprises two or more input devices, usable by two or more users.

9. The system of claim 1, wherein the input device comprises two gloves wearable by a user.

10. The system of claim 9, wherein the locating system is further configured to identify a first two-handed user input in response to the input device being manipulated into a first two-handed gesture, and a second two-handed user input in response to the input device being manipulated into a second two-handed gesture.

11. The system of claim 1, further comprising the projection system configured to display two-dimensional graphics for user feedback in response to a user input through the input device.

12. The system of claim 1, further comprising an audio output configured to provide audible user feedback in response to a user input through the input device.

13. The system of claim 1, wherein the holographic film comprises an interference pattern formed by the interaction of an object beam and a reference beam.

14. The system of claim 1, wherein the second set of tags is located with a fixed distance and direction to first feature of the image.

15. A computer implemented method comprising:
displaying an image using a holographic device including a holographic film, the image consisting of a static, digitally generated, three-dimensional, autostereoscopic, full-parallax, real image;
illuminating the holographic film and displaying two-dimensional shapes onto the holographic film;
detecting a first set of one or more tags mounted on at least one input device that is a glove wearable by a user;
detecting a second set of one or more tags mounted on a support system of the holographic device and located with a fixed distance and direction relative to the image;
determining locations of the first and second set of tags;
calculating a location of a first feature of the image in response to the location of the second set of tags;
calculating a distance and direction between the input device and the first feature of the image in response to the location of the first and second sets of tags; and
identifying an intersection of the input device with the first feature of the image in response to the distance and direction between the input device and the first feature of the image.

16. The method of claim 15, further comprising:
identifying a user input in response to a gestural motion of the input device.

17. The method of claim 15, further comprising:
identifying the first feature of the image in response to a user using the input device to point at the first feature of the image.

18. The method of claim 15, further comprising identifying the first feature of the image in response to a user using the input device to poke the first feature of the image.

19. The method of claim 18, further comprising:
identifying a second feature of the image in response to a user using the input device to poke the second feature of the image.

20. The method of claim 15, further comprising:
displaying the two-dimensional shapes onto a tabletop aligned with the image.

21. The method of claim 15, further comprising:
identifying a first two-handed user input in response to the input device being manipulated into a first two-handed gesture, and a second two-handed user input in response to the input device being manipulated into a second two-handed gesture.

22. The method of claim 15, further comprising:
providing an audio output in response to a user input through the input device.

23. A non-transitory computer readable medium comprising instructions executable by a processor to perform a method comprising acts of:
displaying an image using a holographic device including a holographic film, the image consisting of a static, digitally generated, three-dimensional, autostereoscopic, full-parallax, real image;
illuminating the holographic film and displaying two-dimensional shapes onto the holographic film;
detecting a first set of one or more tags mounted on at least one input device that is a glove wearable by a user;
detecting a second set of one or more tags mounted on a support system of the holographic device and located with a fixed distance and direction relative to the image;
determining locations of the first and second set of tags;
calculating a location of a first feature of the image in response to the location of the second set of tags;
calculating a distance and direction between the input device and the first feature of the image in response to the location of the first and second sets of tags; and
identifying an intersection of the input device with the first feature of the image in response to the distance and direction between the input device and the first feature of the image.

* * * * *